G. Richards,
Dish Cleaner,

No. 61,256.     Patented Jan. 15, 1867.

Witnesses:
Geo Tusch
J. A. Servis

Inventor:
Gilbert Richards
Per Munn & Co.
Attorneys

United States Patent Office.

GILBERT RICHARDS, OF CUMMINGTON, MASSACHUSETTS.

*Letters Patent No. 61,256, dated January 15, 1867.*

---

IMPROVED DISH-WASHING MACHINE.

---

The Schedule referred to in these Letters Patent and making part of the same.

---

TO ALL WHOM IT MAY CONCERN:

Be it known that I, GILBERT RICHARDS, of Cummington, in the county of Hampshire, and State of Massachusetts, have invented a new and useful Improvement in Dish-Washing Machine; and I do hereby declare that the following is a full, clear, and exact description of the same, which will enable others skilled in the art to make and use it, reference being had to the accompanying drawings, forming a part of this specification, in which—

Similar letters of reference indicate like parts.

My invention has for its object to furnish an improved machine, by means of which dishes may be washed quickly and thoroughly; and it consists in the combination and arrangement of the wire screen, winged shaft, and gear-wheels with each other and with the cylindrical vessel in which they are placed.

Figure 1:
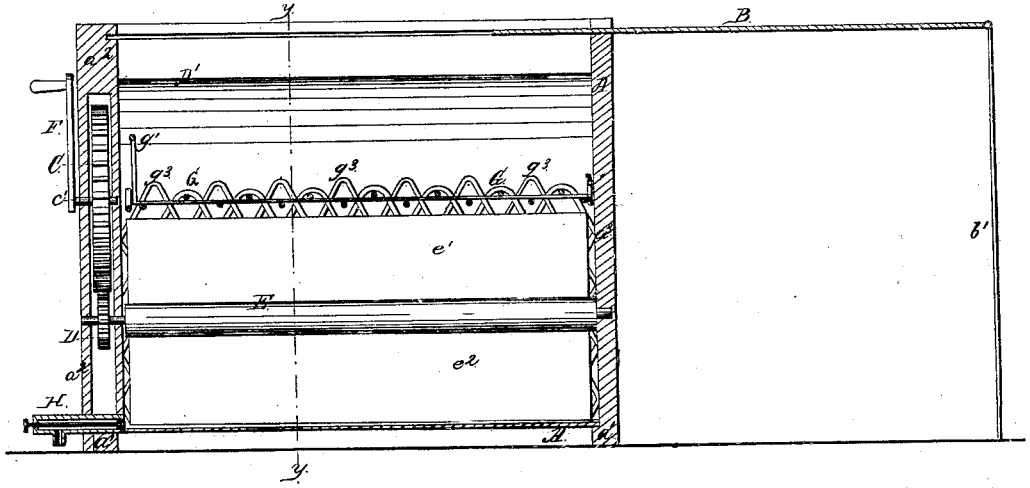
Figure 1 is a vertical longitudinal section of my improved machine, taken through the line $x\ x$, fig. 2.
Figure 2:
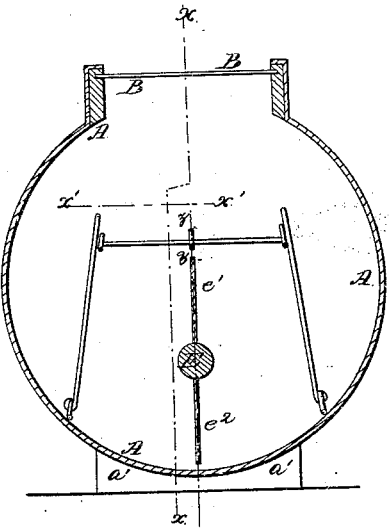
Figure 2 is a vertical cross-section of the same, taken through the line $y\ y$, fig. 1.
Figure 3:
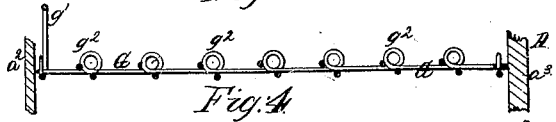
Figure 3 is a detail sectional view of the same, taken through the line $z\ z$, fig. 2.
Figure 4:
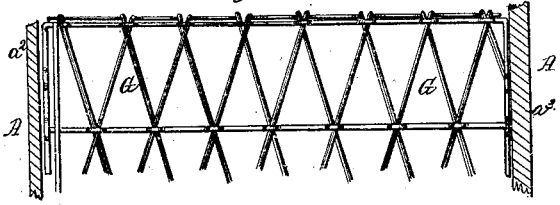
Figure 4 is a detail sectional view of the same, taken through the line $x'\ x'$, fig. 2.

A is a cylindrical-shaped vessel, resting upon blocks or feet, $a^1$, as shown in figs. 1 and 2. The upper side or top of the box is cut away, and the opening thus formed is closed by a sliding-lid or cover, B, to the outer end of which is pivoted a supporting leg, $b^1$, so that when the said cover is drawn out and the leg $b^1$ turned down into the position shown in fig. 1, the said cover may serve as a table to support dishes to be put into or which have been taken out of the machine. The gear-wheels C and D, by which motion is imparted to the winged shaft E, are placed within the casing or end wall $a^2$ of the vessel A, as shown in fig. 1. One end of the journal $c^1$ of the gear-wheel C projects outward, and to it is attached the crank F, by means of which the machine is operated. The teeth of the gear-wheel C mesh into the teeth of the gear-wheel D, which is securely attached to the journal of the shaft E, as shown in fig. 1. The shaft E revolves in bearings in the ends $a^2$ and $a^3$ of the vessel A, and it has wings or paddles, $e^1$ and $e^2$ attached to its sides, as shown in figs. 1 and 2. G is a wire screen, so formed and arranged as to prevent the dishes, when placed in the machine, from coming in contact with the wings $e^1\ e^2$ of the shaft E. $g^1$ is a wire, crossing the screen G at one end and a little above it. $g^2$ are a series of loops arranged along the central line, and $g^3$ are series of loops arranged along the side edges of the upper side of the screen G, as shown in figs. 1, 2, 3, and 4. In arranging the dishes for being washed, the lower edge of the first plate is placed below one of the loops, $g^2$, and its upper edge resting upon the wire $g^1$. The other plates are arranged with their lower edges below the loops $g^2$, and their upper edges resting upon the plate or plates in front of them. Two rows of smaller plates may be arranged in the same manner along the series of loops $g^3$. Cups, saucers, goblets, preserve dishes, &c., &c., may be arranged between the sides of the screen G and the sides of the vessel A, care being taken in all cases to place the dishes so that their inner sides may be towards the said screen G. When the dishes have been arranged, the proper amount of water put into the machine, and the sliding cover B closed, the crank F is turned, revolving the shaft E and projecting the water from the wings $e^1$ and $e^2$ against the dishes, washing them clean in a very short time. H is a stop-cock, closed by a valve, or in any other convenient manner, through which the water may be drawn from the machine when desired.

I claim as new, and desire to secure by Letters Patent—

The combination and arrangement of the wire screen G, extending longitudinally of the cylindrical vessel A, from one end to the other thereof, the horizontal winged shaft E, and gear-wheels C and D, with each other and with the cylindrical vessel A, as herein described and for the purpose specified.

GILBERT RICHARDS.

Witnesses:
 NATHAN ORCUTT,
 ALMON MITCHELL.